(12) United States Patent
Blaylock et al.

(10) Patent No.: US 6,695,130 B1
(45) Date of Patent: Feb. 24, 2004

(54) CHAIN CONVEYOR WITH SLACK REMOVAL APPARATUS

(75) Inventors: Dan E. Blaylock, Russellville, AL (US); Don F. Lewis, Florence, AL (US)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/349,350

(22) Filed: Jan. 22, 2003

(51) Int. Cl.⁷ ............................................. B65G 23/44
(52) U.S. Cl. ..................................... 198/813; 198/625.5
(58) Field of Search ........................... 198/813, 626.5, 198/834

(56) References Cited

U.S. PATENT DOCUMENTS

| | | | |
|---|---|---|---|
| 3,777,879 A | * 12/1973 | Dehne | 198/208 |
| 4,007,826 A | * 2/1977 | Brown, Jr. et al. | 198/813 |
| 4,284,192 A | * 8/1981 | Taylor | 198/813 |
| 4,504,251 A | * 3/1985 | Mittermeier | 474/110 |
| 4,508,213 A | * 4/1985 | Kelley | 198/813 |
| 4,799,584 A | * 1/1989 | Hartsuiker et al. | 198/709 |
| 5,131,528 A | * 7/1992 | Bandy, Jr. | 198/813 |
| 5,899,321 A | 5/1999 | El-Ibiary | |
| 6,073,755 A | * 6/2000 | Hilliard et al. | 198/813 |
| 6,106,082 A | * 8/2000 | Gustin | 305/145 |
| 6,349,812 B1 | * 2/2002 | Epp et al. | 198/813 |
| 6,516,941 B1 | * 2/2003 | Buhne | 198/813 |

* cited by examiner

Primary Examiner—Douglas Hess
(74) Attorney, Agent, or Firm—Stiennon & Stiennon

(57) ABSTRACT

A chain conveyor having an idler shaft mounted to a carriage which is mounted to a frame for sliding motion along the direction of a chain conveyor bed. Hydraulic cylinders extend between the frame and the carriage and are constantly supplied with hydraulic oil at relatively low pressure such as can be developed with ordinary shop air pressure applied to an air-oil tank The hydraulic lines supplying fluid to the hydraulic cylinders have check valves which only allow hydraulic fluid into the cylinders, thus allowing the cylinders only to move the carriage on which the idler shaft is mounted away from the drive shaft. When the chain conveyor is momentarily reversed, the entire loaded weight of the conveyor is now applied to the idler shaft, however, the check valves prevent hydraulic fluid from leaving the hydraulic cylinders, thus preventing any motion of the carriage.

6 Claims, 4 Drawing Sheets

CHAIN CONVEYOR WITH SLACK REMOVAL APPARATUS

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to log handling equipment in general and to chain conveyors in particular.

After logs which are being processed for paper pulp or engineered wood products such as strandboard are debarked in a debarker, a chain conveyor is often used to transport the logs from the debarking drum to a flaker or other equipment for further processing. A chain conveyor has a plurality of chains, constructed of pivotal links which are drawn by a plurality of sprockets mounted on a drive shaft over the deck of a conveyor. At the drive sprockets the chains pass under the conveyor deck returning to the beginning of the conveyor where they pass over idler wheels and again begin their travel over the deck of the conveyor. As the conveyor chains wear, the chains become longer because the pins become smaller and the openings which the pins fit into become larger. Over time the excess chain hangs in a catenary under the conveyor. From time to time links can be removed from the chain, but the slack under the conveyor requires the conveyor to be elevated above the ground.

One known solution is to use two additional pulleys in a S-wrap configuration to take up the slack. The additional pulleys may be manually adjusted so as to take up the slack. Keeping slack to a minimum in the conveyor chains is important because, although the chains are normally driven in only one direction, if logs become jammed on the conveyor it is necessary to run the conveyor in reverse, and sometimes back and forth until the jam is broken. When the drive system is reversed, the drive shaft is no longer pulling on the loaded chain but pulls on the slack chain on the underside of the conveyor. The chains which are unloaded because of the slack may jump the sprockets, resulting in substantial cost and time expenditures, if not actual damage to the conveyor. One known solution is to replace the idler wheels with a second drive shaft and sprockets and a second drive system. However the additional drive shaft and drive system, while only used intermittently, substantially increase the cost of the chain conveyor. What is needed is a chain conveyor which can be mounted low to the ground and which does not develop slack in the conveyor chains.

SUMMARY OF THE INVENTION

The chain conveyor of this invention has an idler shaft to which idler wheels are mounted. The shaft is mounted to a carriage which is mounted to a frame for sliding motion along the direction of the chain conveyor bed. Hydraulic cylinders extend between the frame and the carriage and are constantly supplied with hydraulic oil at relatively low pressure such as can be developed with ordinary shop air pressure applied to an oil reservoir. When the conveyor is driven in the normal direction, the relatively low hydraulically applied stretching action removes slack from the conveyor chains by moving a carriage containing the idler shaft on idler wheels away from the drive shaft, increasing the length of the conveyor bed. The hydraulic lines supplying fluid to the hydraulic cylinders have check valves which only allow hydraulic fluid into the cylinders, thus allowing the cylinders only to move the carriage on which the idler shaft is mounted away from the drive shaft. When the chain conveyor is momentarily reversed, the entire loaded weight of the conveyor is now applied to the idler shaft, however the check valves prevent hydraulic fluid from leaving the hydraulic cylinders thus preventing any motion of the carriage. Much like a boa constrictor, the chain is tightened when there is little resistance to tightening, and the chain is held tightened when heavily loaded.

It is an object of the present invention to provide a chain conveyor in which slack is removed from the returning path of the chains without having depth to the conveyor structure.

It is another object of the present invention to provide a chain conveyor which can be driven in both directions, without the cost of two drive systems.

It is a further object of the present invention to provide a low-cost hydraulic system which supports large loads.

Further objects, features and advantages of the invention will be apparent from the following detailed description when taken in conjunction with the accompanying drawings.

DESCRIPTION OF THE PREFERRED EMBODIMENTS

Figure 1:
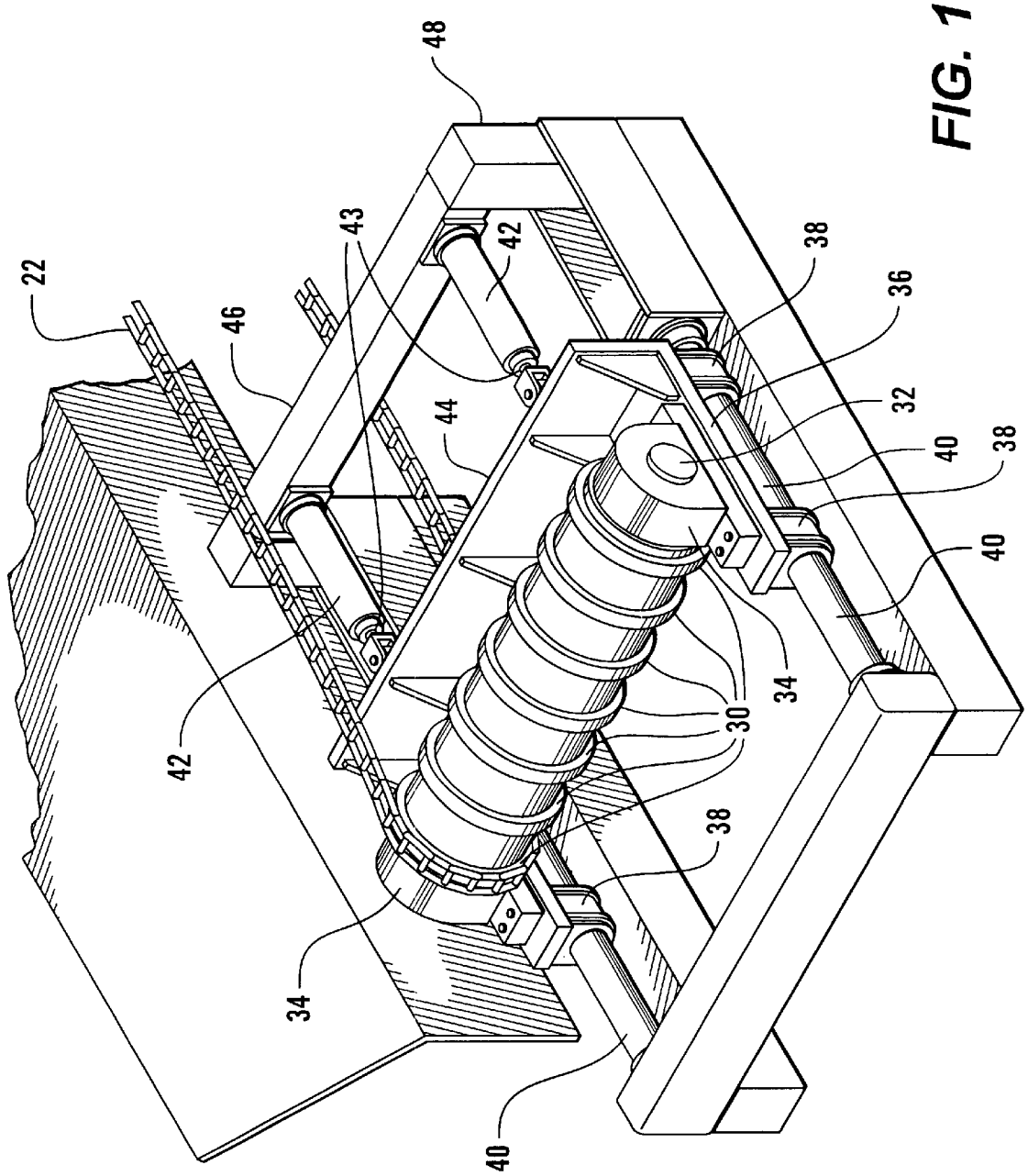
FIG. 1 is an isometric view of the chain conveyor and the slack removal system of this invention.
Figure 2:
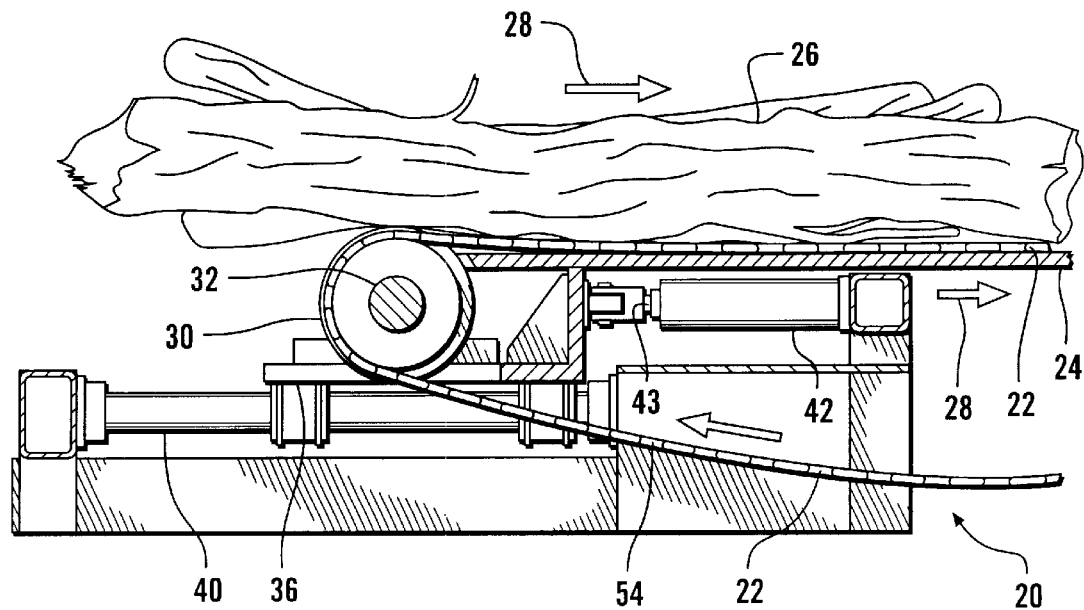
FIG. 2 is a fragmentary side elevational cross sectional view of the chain conveyor and slack removal system of FIG. 1.
Figure 3:
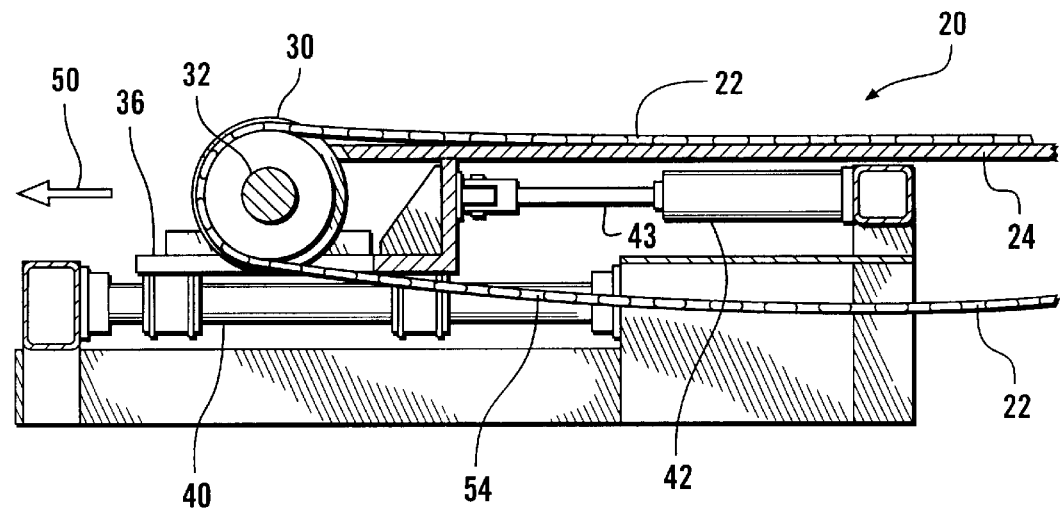
FIG. 3 is a side elevational cross sectional view of the chain conveyor and slack removal system of FIG. 1 where slack has been removed by translation of the idler shaft.
Figure 4:
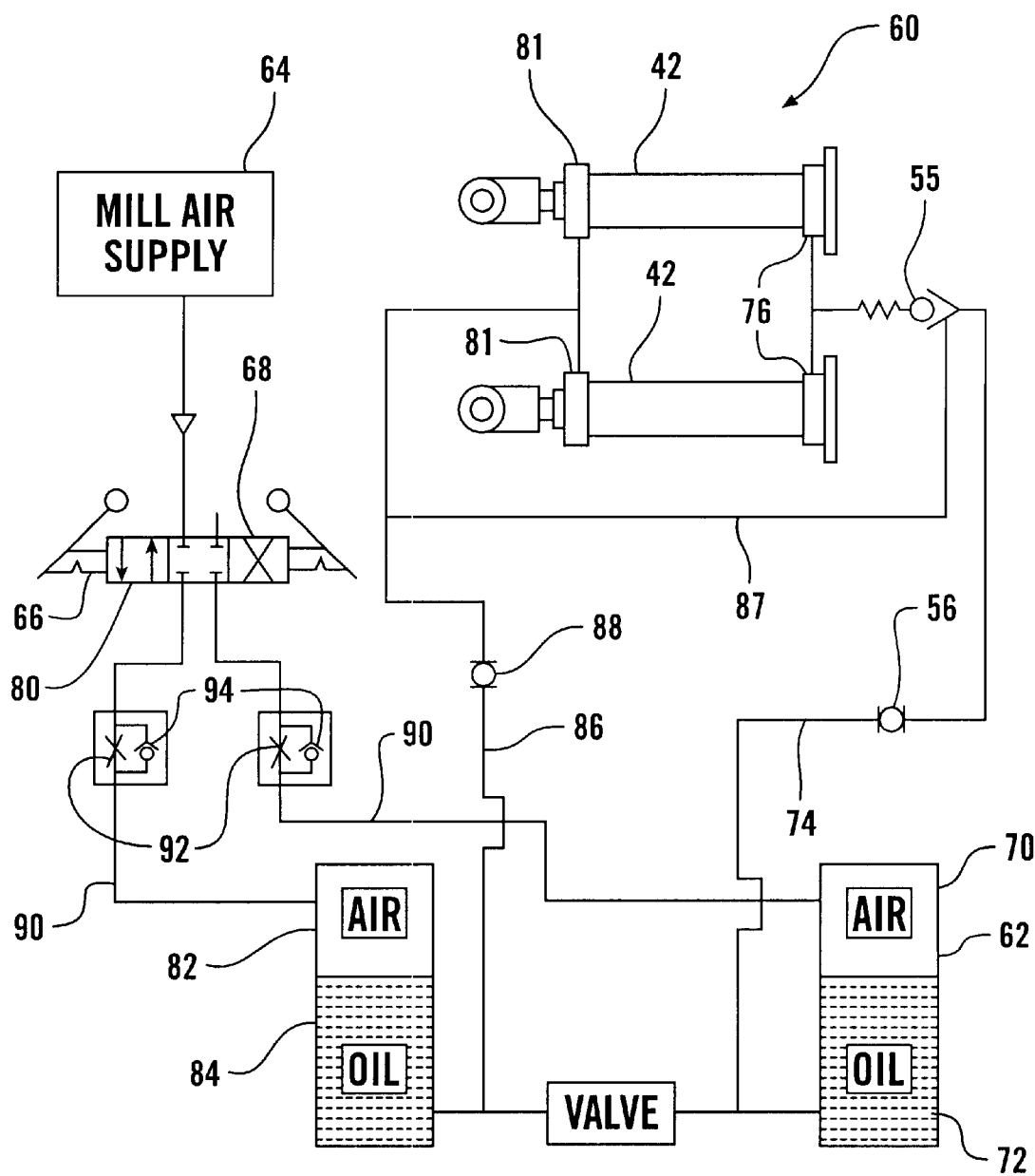
FIG. 4 is a schematic view of a hydraulic system used for moving a carriage on which the idler shaft is mounted.
Figure 5:
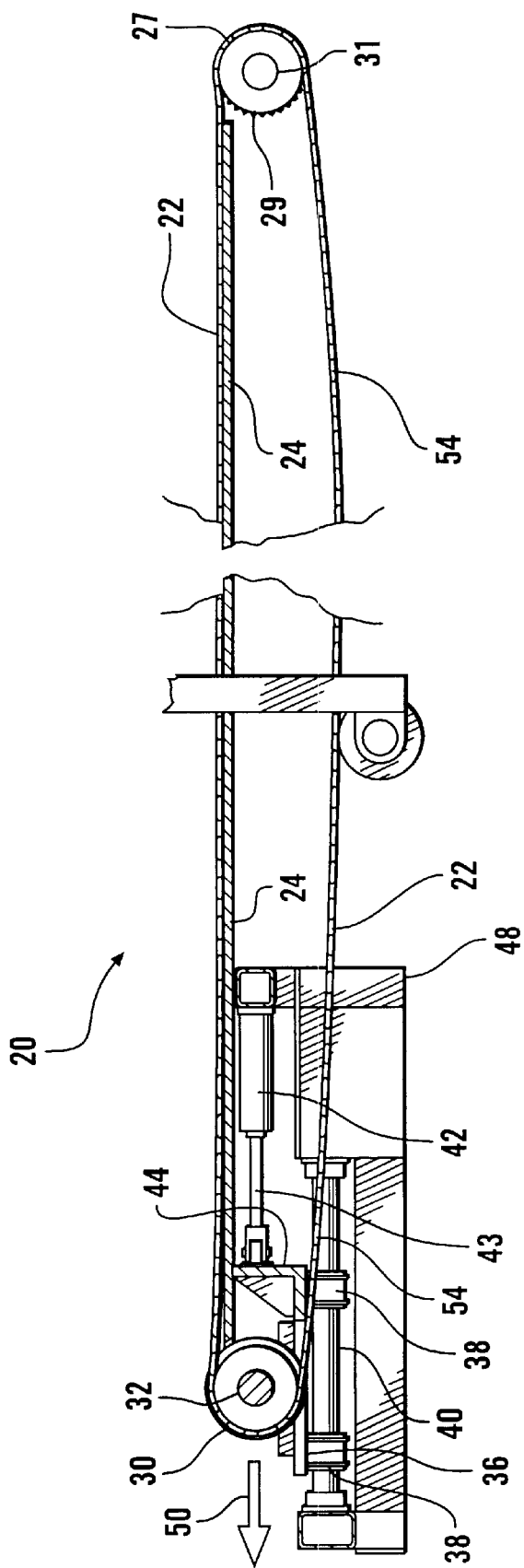
FIG. 5 is a side elevational cross sectional view of the chain conveyor of FIG. 1.

Referring more particularly to FIGS. 1–5, wherein like numbers refer to similar parts, a portion of a chain conveyor 20 is shown in FIG. 2. The chain conveyor 20 has a plurality of chains 22 which slide along the deck 24 conveying logs 26 in the direction of the conveyor as indicated by arrows 28. The chains 22 continue along the length of the conveyor 20 which may be about sixty-five to more than a hundred feet long. As shown in FIG. 5, at the discharge end 27 of the conveyor, sprockets 29 are mounted on a drive shaft 31 and driven by a motor drive system (not shown) which pulls the chains 22 along the deck 24. After the chains 22 pass around the sprockets 29 of the drive shaft 31 they return under the conveyor 20, as shown in FIG. 2, to idler wheels 30 mounted on an idler shaft 32.

The idler shaft 32 is mounted by bearings 34 to a carriage 36. The carriage 36 is mounted by slide bearings 38 to a pair of horizontal shafts 40. A pair of hydraulic cylinders 42 is mounted between a reinforced support flange 44 forming part of the carriage 36, and a portion 46 of the conveyor support frame 48. The hydraulic cylinders 42 are aligned in the direction of the conveyor 20 to cause linear motion of the carriage 36 along the horizontal shafts 40 in the direction indicated by arrow 50 as illustrated in FIGS. 2 and 3.

When the conveyor 20 is used to transport logs 26 the weight of the logs is substantial, depending on the length of the conveyor approximately 50 to 100 tons. Thus the load on the chains may be tens of tons or more. Conventional hydraulic cylinders can easily be operated at pressures of thousands of PSI, however the hydraulic system incorporating hydraulic pumps capable of these high pressures are not without considerable expense, and might impact overall reliability and maintenance costs. In normal operation, with the conveyor 20 moving in the direction indicated by arrows 28, the forces on the idler shaft 32 are very low, resulting only from the tension in the returning chain 54. Thus in normal operation hydraulic fluid at about 90 PSI is more than sufficient with reasonably sized cylinders to remove slack from the returning chain 54 by driving the carriage 36 in the direction indicated by arrow 50.

If the hydraulic pistons 43 of the hydraulic cylinders 42 each have a cross-sectional area of six inches, hydraulic fluid supplied at ninety PSI will produce 1080 pounds of force. The hydraulic actuators each consisting of a hydraulic piston 43 and a hydraulic cylinder 42 move the carriage 36 with the forces produced by the hydraulic fluid to remove slack from the returning chain 54. If the conveyor 20 drive system (not shown) reverses the direction of the conveyor chains 22, the entire load caused by the weight of logs is applied twice to the idler shaft 32 and thus the carriage 36 and the hydraulic cylinders 42. The load is applied twice based on simple kinematic principles that the tension in the chains 22 leading to the idler shaft 32 and the chains 54 leading away from the idler shaft apply the same load in the same direction. The hydraulic cylinders now support a pressure of up to two thousand psi or more in the hydraulic fluid supporting the pistons 43. However, because no motion of the carriage 36 is required under the high load condition a simple check valve 55, as illustrated in FIG. 4, is all that is needed to prevent carriage motion. The check valve 55 prevents the high pressure hydraulic fluid from leaving the hydraulic cylinders 42. The hydraulic cylinders 42 must be selected to withstand the maximum hydraulic loads which the conveyor drive system can impose, but no hydraulic supply system at the high pressure is required. Thus a hydraulic system which supplies relatively low pressures preferably below 300 PSI more preferably about 90 PSI can through the operation of check valve 55 makes use of hydraulic pressures which are five or ten, or even twenty or more times the supply pressure. The high pressures are generated as static loads which do not require a high pressure hydraulic supply system.

Referring to FIG. 4, the simplicity and low cost of the hydraulic system 60 used with the hydraulic cylinders 42 is illustrated. A first hydraulic accumulator 62, represented schematically in FIG. 4, is supplied with air from the mill air supply 64 which has been conditioned as is conventional by filtering, drying and lubricating. A valve 66 in a first position 68 causes relatively low pressure air, typically ninety PSI, to flow to the upper chamber 70. Air pressure from the upper chamber 70 of the accumulator causes oil from the lower chamber 72 of the accumulator 62 to flow through a hydraulic line 74 to the bottom 76 of the hydraulic cylinders 42 causing the pistons 43 to extend as illustrated in FIG. 3. In normal operation, hydraulic pressure is being constantly applied keeping a constant tension on the returning chain 54. As the chain wears and becomes longer and develops slack, the slack is taken up by motion of the idler shaft 32 on the carriage 36 in the direction indicated by arrow 50.

When the conveyor 20 is reversed and the hydraulic cylinders 42 are now highly loaded hydraulic fluid is prevented from leaving the hydraulic cylinders by a check valve 55 illustrated in FIG. 4 which prevents fluid from leaving the hydraulic cylinders 42. When the chains 22 are resized, by removing links, or when the chain is replaced, the hydraulic pistons are retracted by supplying hydraulic fluid to the opposite sides 81 of the hydraulic pistons 43 which are of the double acting type. By moving the valve 66 to a second position 80 the upper chamber 70 of the first hydraulic accumulator or 62 is vented to the atmosphere, and mill air supply is supplied to the upper chamber 82 of a second air-oil tank 84. The second air-oil tank 84 is connected by a hydraulic line 86 to the opposite sides 81 of the hydraulic cylinders 42. A bypass line 87 in the hydraulic line 86 opens the pilot-operated check valve 55 so motion of the hydraulic pistons in the retracting direction indicated by arrows 28 is allowed.

Isolation gate valves 56 and 88 are used during maintenance to isolate the hydraulic cylinders 42 from the hydraulic supply system. The flow rates for air vented from the air-oil tanks 70 and 83 to the atmosphere through lines 90 are controlled by needle throttle valves 92. Check valves 94 connected in parallel with the throttle valves 92 allow unobstructed flow of air when the upper chambers 70, 82 are connected by the valve 66 to the mill air supply.

It should be understood that the hydraulic supply system could be employ a low pressure hydraulic pump instead of mill air as the power source for the hydraulic supply system.

It is understood that the invention is not limited to the particular construction and arrangement of parts herein illustrated and described, but embraces all such modified forms thereof as come within the scope of the following claims.

We claim:

1. A chain conveyor comprising:
   a conveyor deck, having an in feed side, and an out feed side;
   a drive shaft having a plurality of drive sprockets on the out feed side of the conveyor deck;
   an idler shaft having a plurality of idler wheels, mounted on the in feed side of the conveyor deck;
   a plurality of chains constructed of a plurality of links extending between the drive sprockets on the drive shaft and the idler wheels on the idler shaft;
   wherein the idler shaft is mounted by at least two bearings to a carriage which is mounted for linear motion away from the drive shaft, to remove slack from the plurality of chains;
   at least one hydraulic actuator mounted to the carriage to cause linear motion away from the drive shaft;
   a hydraulic source connected by a hydraulic line to a hydraulic cylinder, the hydraulic cylinder having an extensible piston the hydraulic cylinder and hydraulic piston forming the hydraulic actuator; and
   a check valve positioned to control the flow of hydraulic fluid from an accumulator to the hydraulic cylinder so that hydraulic fluid can flow from the hydraulic source to the hydraulic cylinder but cannot flow back through the hydraulic line to the hydraulic source.

2. The chain conveyor of claim 1 wherein the hydraulic source has a pressure of less than about 300 PSI.

3. The chain conveyor of claim 1 wherein the at least one hydraulic actuator is of the double acting type, having a first side connected to the hydraulic source through the check valve, and further comprising a pilot hydraulic line between a second side and the check valve, the check valve causing the actuator to remain in an extended position, the pilot hydraulic line connected to a source of hydraulic pressure to open the check valve, and supply hydraulic pressure to the second side to retract the piston.

4. A method of controlling slack in chains used in a chain conveyor comprising the steps of:
- operating a powered drive shaft to drive a chain conveyor in a first direction so that a plurality of conveyor chains travel from idler wheels on an idler shaft along a conveyor deck to drive sprockets mounted on the drive shaft;
- directing the plurality of conveyor chains to travel beneath the drive deck so as to return to the idler wheels on the idler shaft;
- while the chain conveyor is driven in a first direction, supplying hydraulic fluid at a first pressure to at least one hydraulic cylinder of a hydraulic actuator which extends a piston to cause linear motion of a carriage on which the idler shaft is mounted by bearings, the linear motion being in the direction opposite the first direction;
- driving by operation of the powered drive shaft the chain conveyor in a second direction opposite the first direction so that the plurality of conveyor chains travel from the drive sprockets mounted on the drive shaft along a conveyor deck to the idler wheels on the idler shaft, simultaneously preventing hydraulic fluid from leaving the at least one hydraulic cylinder by a check valve so that the carriage is held motionless by a second hydraulic fluid pressure at least five times the first hydraulic pressure, said second hydraulic pressure resulting from and being proportional to twice a tension which is developed in the plurality of chains by a moving a conveyed load along the conveyor deck in the second direction.

5. The method of claim 4 wherein the second hydraulic fluid pressure is at least ten times the first hydraulic pressure.

6. The method of claim 4 wherein the hydraulic actuator is of the double acting type, further comprising the step of retracting the piston in the first direction by supplying hydraulic fluid under pressure to the second side of the hydraulic actuator and simultaneously supplying hydraulic fluid under pressure to open a pilot-operated check valve to allow hydraulic fluid to drain from the at least one hydraulic cylinder.

* * * * *